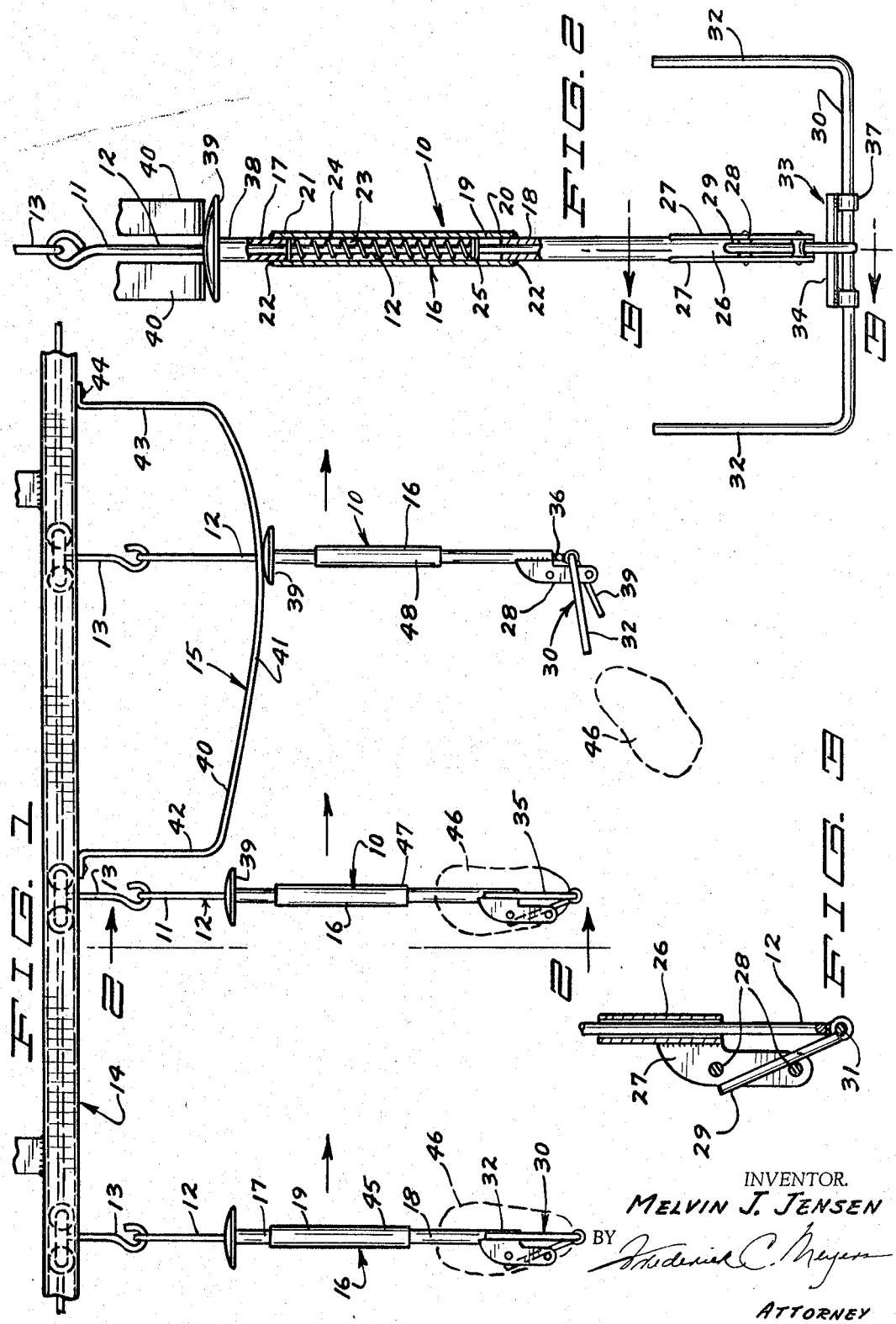

United States Patent Office 3,298,500
Patented Jan. 17, 1967

1

3,298,500
POULTRY CONVEYING AND TRIPPING DEVICE

Melvin J. Jensen, Barron, Wis., assignor of fifty percent to Wallace H. Jerome, Barron, Wis.
Filed May 19, 1965, Ser. No. 469,016
5 Claims. (Cl. 198—177)

This invention relates to suspension and conveying devices and more particularly to a conveying and tripping hook for poultry.

In the poultry dressing industry, as well as any other industry being carried on under mass production circumstances, an important aspect of the business is transporting the product from one station to another with a minimum of labor and a maximum of speed. In the poultry industry, it is not only desirable to provide a means of speedy conveyance of fowl, but also to provide ready drainage and sanitary conditions during dressing operations.

It is with the above desirable attributes of a conveying system that I have devised my conveying and tripping hook and accordingly:

An object of this invention is to provide a means for easily receiving and conveying large quantities of poultry and then automatically to deposit them in a positive manner at a predetermined location.

Another object of this invention is to provide a conveying means for large quantities of poultry wherein the conveying means will maintain the poultry in a position commensurate wtih maximum drainage after the poultry has been dressed.

A further object of this invention is to provide a conveying and tripping hook of the class described which is simple in design and economical in construction.

These and other objects and advantages of my invention will more fully appear from the following description, made in connection with the accompanying drawing, wherein like reference characters refer to the same or similar parts throughout the several views and in which:

FIGURE 1 is a side view of a typical conveyance system having the conveying and stripping hook indicated in both the normal and actuated positions;

FIGURE 2 is an enlarged view of FIGURE 1 taken at line 2—2, a portion of the hook being in cross section; and FIGURE 3 is a cross sectional view of FIGURE 2 taken on line 3—3, portions thereof being in full line drawing.

With more particular reference now to FIGURE 1, the conveying and tripping hook indicated generally as 10 is shown attached at the upper end 11 of central shaft 12 to a conveyor system hook 13. The hook 13, of course, is in turn secured to a track and chain system referred to generally as 14.

Also shown in FIGURE 1 is a tripping mechanism indicated generally as 15 which will be explained in greater detail subsequently.

For a further detailed explanation of the conveying and tripping hook 10, reference is made to FIGURE 2 wherein the central shaft 12 has positioned therearound a sleeve 16 which, it is found, is readily constricted by having an upper inner sleeve 17 and a lower inner sleeve 18 joined together by a larger outer sleeve 19 which is in turn welded at ends 20 and 21, respectively, at welds 22 to the inner sleeves. By providing this arrangement, a spring chamber 23 is provided which gives sufficient clearance for a compression spring 24 which encircles shaft 12. As indicated in the cross section of FIGURE 2, the sleeves are chosen of such inside and outside diameter as to accommodate interfitting of the sleeves with each

2 other, as well as the inner sleeves 17 and 18 with the central shaft 12.

Shown positioned at the bottom of the spring 24 and encircling and secured to the central shaft 12 is a spring seat 25. The spring seat 25 provides a stationary support for the spring when the hook is being actuated by the tripping mechanism 15, the operation of which will be explained subsequently. The spring 24 is held at the upper end thereof in abutment with the upper sleeve 17 adjacent end 21 of outer sleeve 19.

With continued reference to FIGURE 2 and FIGURE 3, the lower sleeve 18 has secured at the lower end 26 a release mechanism having a pair of guide plates 27 which may be welded thereto. In addition, the release mechanism has positioned across the guide plates 27 two guide pins or rollers 28 which, as better seen in FIGURE 3, control the angle of the release lever 29.

The release lever 29 forms an integral part of the rocker shaft 30 and is fixedly secured thereto at joint 31 at a predetermined angulation with respect to the prongs 32.

As seen in FIGURE 2, the rocker shaft 30 is supported by a bracket 33 which has, in turn, a cross piece 34 which is secured to the lower end 35 (see FIGURE 1) of central shaft 12, at joint 36, and a pair of rocker shaft guides or supports 37. The rocker shaft guides have a sufficient inside diameter to allow free rotational movement of the rocker shaft 30.

With further reference to FIGURE 2, the upper sleeve 17 has secured to the uppermost end 38 a trip plate 39. The trip plate is merely a dishshaped plate which is fixedly secured to the upper sleeve 17 and which has a hole centrally located for free passage of the shaft 12 therethrough. The trip plate has the dish shape so that it may easily engage with the release bars 40 of the tripping mechanism 15.

As seen in FIGURE 1, the tripping mechanism 15 consists of a pair of continuous release bars 40 which have a cam portion 41 supported by the supporting portions 42 and 43 which are in turn secured at their upper ends to track system 14 by feet 44.

Now that the elements of the tripping hook have been described and explained, the operation and use will now be set forth.

Referring to FIGURE 1, the first hook 45 is shown while positioned in the normal position with a fowl 46 placed on either prong 32 of the rocker shaft 30. The fowl 46 is positioned in upstanding relation over the upwardly directed free end of the prong 32 so that, during the conveyance duration, the inner cavities of the fowl are probed by the prong and are allowed to drain free of excess and objectionable liquids (it is presumed that this point, of course, that the fowl has been dressed; however, the conveyance and stripping hook may be used for conveyance of poultry prior to the final dressed condition as considered in these views and explanation).

As may be seen in FIGURE 1, and particularly in FIGURE 3, when the hook is in the normal position, the lower of the guide pins 28 carries the full support of the torque exerted by the release lever 29. Thus, the lower of the guide pins 28 will maintain the prongs 32 in a vertical position and the fowl 46 accordingly positioned.

Second hook 47 of FIGURE 1 is merely the same as that of first hook 45 as the hook more closely approaches the tripping mechanism 15.

Finally, the third hook 48 shows the hook after it has been actuated out of the normal position wherein the rocker shaft 30 has been rotated to allow the prongs 32 to position for release of the fowl 46 therefrom. The actuation of the hook began when the trip plate 39 first came in contact with the cam portion of the release bars 40. As the conveyor hook 13 pulled the hook forward, the cam portion increasingly caused the trip plate and sleeve 16 to be forced downwardly under vertical force. Since the shaft 12 is fixedly secured to hook 13, there will be caused a relative movement between the shaft 12 and sleeve 16 against the spring tension of spring 24. This relative movement causes the upper of the guide pins 28 to vertically descend upon the release lever 29 and causes the rocker shaft to rotate the prongs 32 downwardly thus, as explained above, releasing the fowl 46 therefrom through gravitational forces. Thus, it may be seen that when the tripping mechanism 15 is positioned over a predetermined location, such as a work bench area, the fowl 46 will always be deposited at the same place.

Once the fowl 46 has released from the hook 10, further movement of the conveyor hook 13 will cause forward movement of the hook 10 and subsequent release of the trip plate 39 from the cam portion 41 whereafter the sleeve and rocker shaft will be repositioned under the spring tension and then be ready for receipt of another fowl preparatory to conveyance to another predetermined location.

Thus, it is seen that a new and novel means of conveying and depositing fowl at a predetermined location has been devised which utilizes simple but reliable elements which are economically constructed. And the same time, a conveying and tripping hook has been devised which, through its design, allows for maximum drainage of undesirable liquids from the fowl carcass.

It will, of course, be understood that various changes may be made in the form, details, arrangements and proportions of the parts without departing from the scope of my invention as set forth in the appended claims.

I claim:

1. A poultry conveying and tripping device comprising, a central shaft adapted to be secured at the upper end thereof to a conveyor, a rocker shaft rotatably carried at the lower end of said central shaft having a prong normally inclining upwardly for receiving and supporting poultry when placed thereon, said rocker shaft also having a release lever having a predetermined angulation with respect to said prong and also inclining upwardly when said prong is inclined upwardly, a sleeve slidably positioned about said shaft, means fixedly attached to the lower end of said sleeve for underlying said release lever to retain said prong in its upwardly inclined position and thus support the poultry for conveying movement, means for normally maintaining said sleeve in a raised position relative said central shaft, and means for actuating said sleeve into a lower position to allow said release lever to assume a declining position and also to allow said prong to assume a declining position in order that the poultry carried on said prong will be gravitationally released.

2. A poultry conveying and tripping device in accordance with claim 1 in which said means for normally maintaining said sleeve in its said raised position includes a coil spring, and said actuating means includes a trip plate on said sleeve and a fixedly disposed cam member for engaging said trip plate to overcome the action of said spring so as to actuate said sleeve into its said lower position and thereby effect the release of the poultry from said prong.

3. A poultry conveying and tripping device comprising, a central shaft adapted to be secured at the upper end thereof to a conveyor, a sleeve positioned about said central shaft, a biasing means interposed between said sleeve and said central shaft for urging said sleeve upwardly into a normal position, a bracket secured to the lower end of said central shaft, a rocker shaft rotatably journaled in said bracket at substantially right angles thereof and having at least a pair of upwardly directed prongs secured thereto adapted for receiving and supporting poultry when placed thereon, a release lever secured to said rocker shaft, a release mechanism secured to the lower end of said sleeve and in engagement with said release lever, and a trip plate secured to said sleeve at the upper end thereof, whereby when said trip plate is forced downwardly said sleeve will move out of normal position and by action of said release mechanism cause said release lever to rotate said rocker shaft out of normal position whereafter said prong will be directed downwardly thus allowing poultry to fall free thereof.

4. A poultry conveying and tripping device in accordance with claim 3 wherein said release mechanism comprises a pair of guide plates secured to said sleeve, and a pair of spacers positioned across said guide plates, said spacers adapted to actuate said release lever which in turn rotates said rocker shaft.

5. A combination comprising a poultry conveying and tripping device having a sleeve, a shaft longitudinally slidable in said sleeve and adapted to be secured to a conveyor at the upper end thereof, a rocker shaft rotatably secured to the lower end of said shaft having a poultry supporting prong extending perpendicularly therefrom and a release lever also extending perpendicularly therefrom in a laterally offset relationship with respect to said prong and at a predetermined angle with respect to said prong, a trip plate secured to the upper end of said sleeve, a transverse element carried at the lower end of said sleeve in an underlying engaged relation with said lever, a trip plate secured to the upper end of said sleeve, and a trip mechanism having a release bar with a cam portion positioned above the path of said trip plate when said poultry conveying and tripping device is being conveyed, whereby said trip plate will be caused to come in contact with said cam portion which in turn will cause said trip plate to be forced downwardly thus causing said transverse element to move downwardly and release poultry when positioned on said prong.

References Cited by the Examiner

UNITED STATES PATENTS

| 2,456,224 | 12/1948 | Sullivan | 198—177 |
| 3,032,172 | 5/1962 | Jensen | 198—177 |

EVON C. BLUNK, *Primary Examiner.*

RICHARD E. AEGERTER, *Examiner.*